United States Patent
Berger et al.

[11] Patent Number: 5,307,727
[45] Date of Patent: May 3, 1994

[54] NEUTRAL TO DRIVE SHIFT TIME CONTROL

[75] Inventors: Todd R. Berger, Plymouth; Tsunlock A. Yu, Saline; Scott B. Pollack, Livonia, all of Mich.

[73] Assignee: General Motors Corporation, Detroit, Mich.

[21] Appl. No.: 885,933

[22] Filed: May 19, 1992

[51] Int. Cl.⁵ .................. F15B 13/04; F16D 31/02
[52] U.S. Cl. .................................. 91/29; 60/435; 60/413; 192/3.33; 192/85 R
[58] Field of Search ............... 91/28, 29; 60/435, 436, 60/437, 438, 439, 440, 413, 415, 416, 494; 192/85 R, 3.33, 70.11, 70.27, 103 R, 103 F

[56] References Cited

U.S. PATENT DOCUMENTS

| | | | |
|---|---|---|---|
| 3,683,618 | 8/1972 | Schacher et al. | 60/494 X |
| 3,700,060 | 10/1972 | Keene et al. | 60/413 X |
| 4,209,985 | 7/1980 | Master | 60/494 X |
| 4,580,671 | 4/1986 | Matsuoka et al. | 192/3.33 X |
| 4,748,809 | 6/1988 | Sumiya et al. | 60/413 X |
| 4,796,739 | 1/1989 | Jonner et al. | 192/85 R X |
| 4,889,016 | 12/1989 | Kuwayama et al. | 74/868 |
| 4,930,080 | 5/1990 | Suzuki | 364/424.1 |
| 5,105,929 | 4/1992 | Schmid et al. | 60/413 X |
| 5,163,811 | 11/1992 | Okada | 192/85 R X |

Primary Examiner—Edward K. Look
Assistant Examiner—Hoang Nguyen
Attorney, Agent, or Firm—Donald F. Scherer

[57] ABSTRACT

In a neutral to drive shift timing control mechanism, a flow control arrangement is utilized in an electro-hydraulic control system for controlling a clutch fill period of a neutral to drive shift sequence. The hydraulic control system provides a pressure pulse of predetermined time which opens a valve to permit fluid flow to bypass an accumulator feed orifice to pressurize the clutch apply cylinder and piston to a value substantially equal to the piston return spring force without providing excess flow to the accumulator. The clutch apply pressure is then permitted to increase at a more normal rate which is controlled by the accumulator. The engagement time is determined so that the pulse time can be adjusted if the neutral to drive shift is not within a predetermined time range.

3 Claims, 8 Drawing Sheets

NEUTRAL TO DRIVE SHIFT TIME CONTROL

BACKGROUND OF THE INVENTION

This invention relates to shift timing controls, and more particularly, to neutral to drive shift timing controls. Specifically, this invention relates to the control of the fill time for an on-coming friction device during a neutral to drive shift sequence.

Automatic transmissions utilize fluid operated or hydraulically applied clutches to provide drive couplings between the prime mover and the vehicle wheels. When the vehicle is at a standstill and a neutral to drive, either forward or reverse, is requested by the operator, a clutch is applied which establishes a reaction to ground through the transmission and drive wheels. This occurs when the operator moves the manual shift lever to forward or reverse, expecting a quick and smooth transition. There have been many attempts with varying degrees of success in providing for a quick and smooth transition during a neutral to drive (garage shift).

In at least one prior art system, the hydraulic fluid is directed from a pressure regulator valve to an accumulator selector valve to an accumulator feed orifice, after which, it is directed to an accumulator through a circuit restriction to a clutch apply chamber. The circuit restriction can be either an orifice plate disposed in the valve body or simply the tortuous fluid path the hydraulic fluid must overcome between the accumulator and the clutch apply chamber.

With systems of this type, the operator initiates a drive condition by shifting the manual valve, which controls the direction of fluid to the appropriate clutch. When the hydraulic fluid pressure at the clutch is sufficiently high, the clutch piston will begin to stroke against the return springs until the friction plates are engaged. When this occurs, the pressure of the feed oil will increase rapidly until the accumulator is pressurized sufficiently to begin stroking against the accumulator trim pressure and the accumulator spring.

While the accumulator is stroking, the feed pressure to the clutch will increase at a rate controlled by the amount of fluid flow, the accumulator volume and the accumulator spring rate. To accomplish a smooth garage shift, it is desired to have the accumulator begin stroking at that same instant that the clutch piston is first brought into engagement with the friction plates. This is the point at which the clutch return springs are overcome by the clutch piston.

One drawback of the system is that a high feed pressure and a high fluid flow are required. This can be accomplished if the feed pressure is maintained sufficiently high. However, with this system there is difficulty in controlling the pressure rise in the clutch apply chamber in that the high flow rate causes rapid accumulator fill. To overcome this situation, it is necessary to increase the accumulator volume which requires the use of space within the transmission envelope. This space is not always available.

Another disadvantage with maintaining high feed pressures and flow rates is that the accumulator must begin its stroke at the same instant that the clutch pressure overcomes the return springs. The high flow rate will result in a significant pressure drop in the circuit restriction between the accumulator and the clutch engagement chamber such that the accumulator will begin stroking during the clutch prefill cycle and therefore will not have the advantage of utilizing a total accumulator volume to control the clutch engagement time.

Other control schemes have been proposed, one of which permits bypassing of the accumulator feed orifice during the prefill cycle. However, with these control schemes, it is very difficult to provide an accumulator of a size sufficient so that it does not begin stroking during the high fill flow period and yet begins to stroke at the system pressure which will overcome the return springs. The end results of such control schemes is somewhat erratic in that at times a firm shift will occur and at other times, a long shift time will occur.

SUMMARY OF THE INVENTION

It is an object of the present invention to provide an improved control system for an automatic transmission, wherein a flow control arrangement is utilized to provide a high flow, high pressure clutch prefill portion in the clutch engagement cycle.

It is another object of this invention to provide an improved control system described above, wherein the prefill time is followed by a low flow, low pressure clutch apply and accumulator fill portion.

It is still another object of this invention to provide an improved hydraulic control system, as described above, wherein the accumulator is controlled to prevent the beginning of accumulator fill during the clutch prefill time portion.

It is a further object of this invention to provide an improved hydraulic control system, as described above, wherein the time that elapses during the clutch prefill portion can be adapted to changing conditions which affect the time required during clutch prefill time portion.

These and other objects and advantages of the present invention will be more apparent from the following description and drawings.

DESCRIPTION OF THE EXEMPLARY EMBODIMENT

Figure 4:
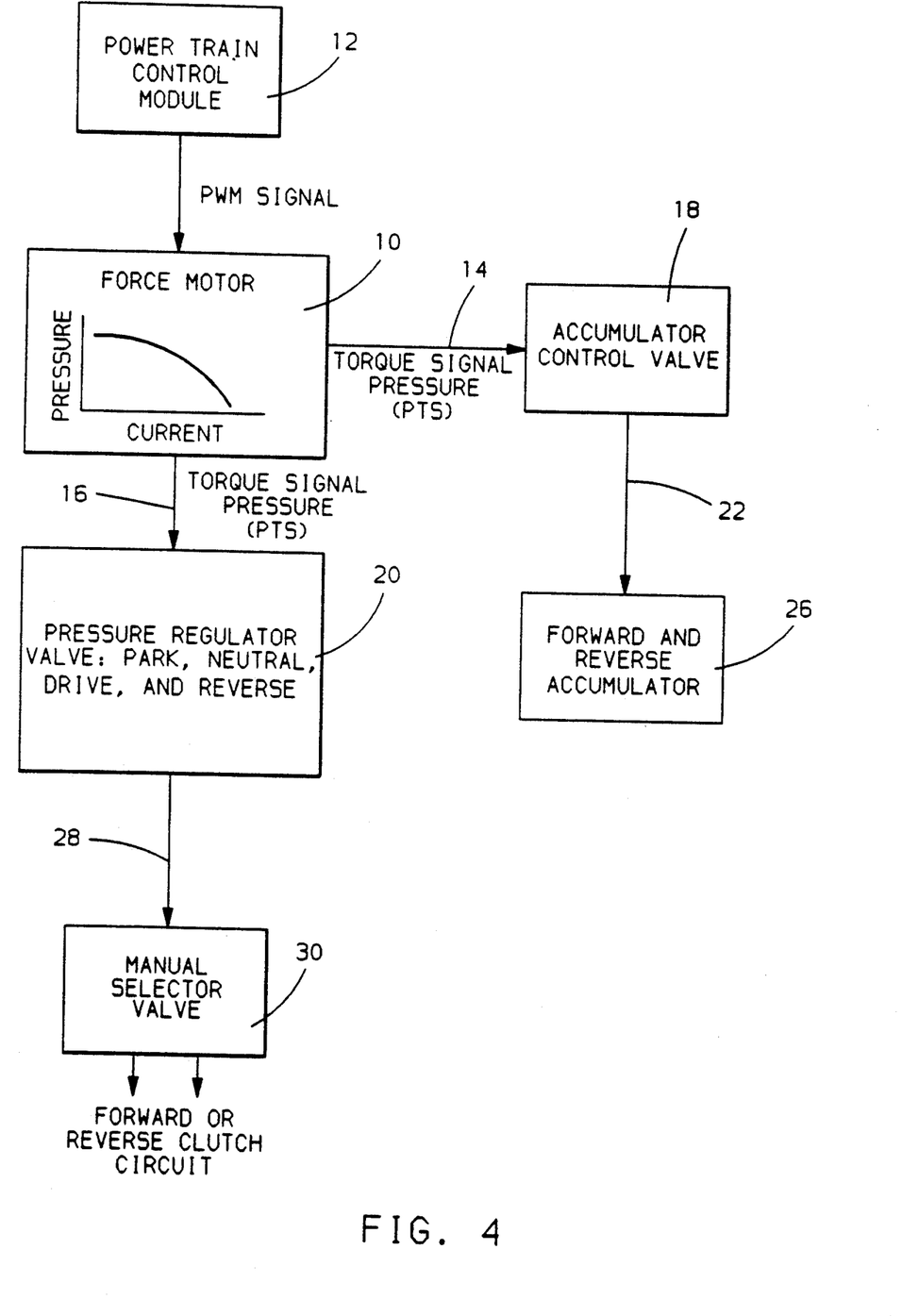
FIG. 4 is a diagrammatic representation of a portion of the electro-hydraulic control system utilized with this invention.

In the present invention, both accumulator trim pressure and line pressure are controlled by a variable force solenoid or force motor represented at 10 in FIG. 4, which receives input signals from a powertrain control module 12. The variable force solenoid 10 distributes a torque signal pressure through passages 14 and 16 for distribution to a conventional accumulator control valve 18 and conventional pressure regulator valve 20, respectively.

Figure 3:
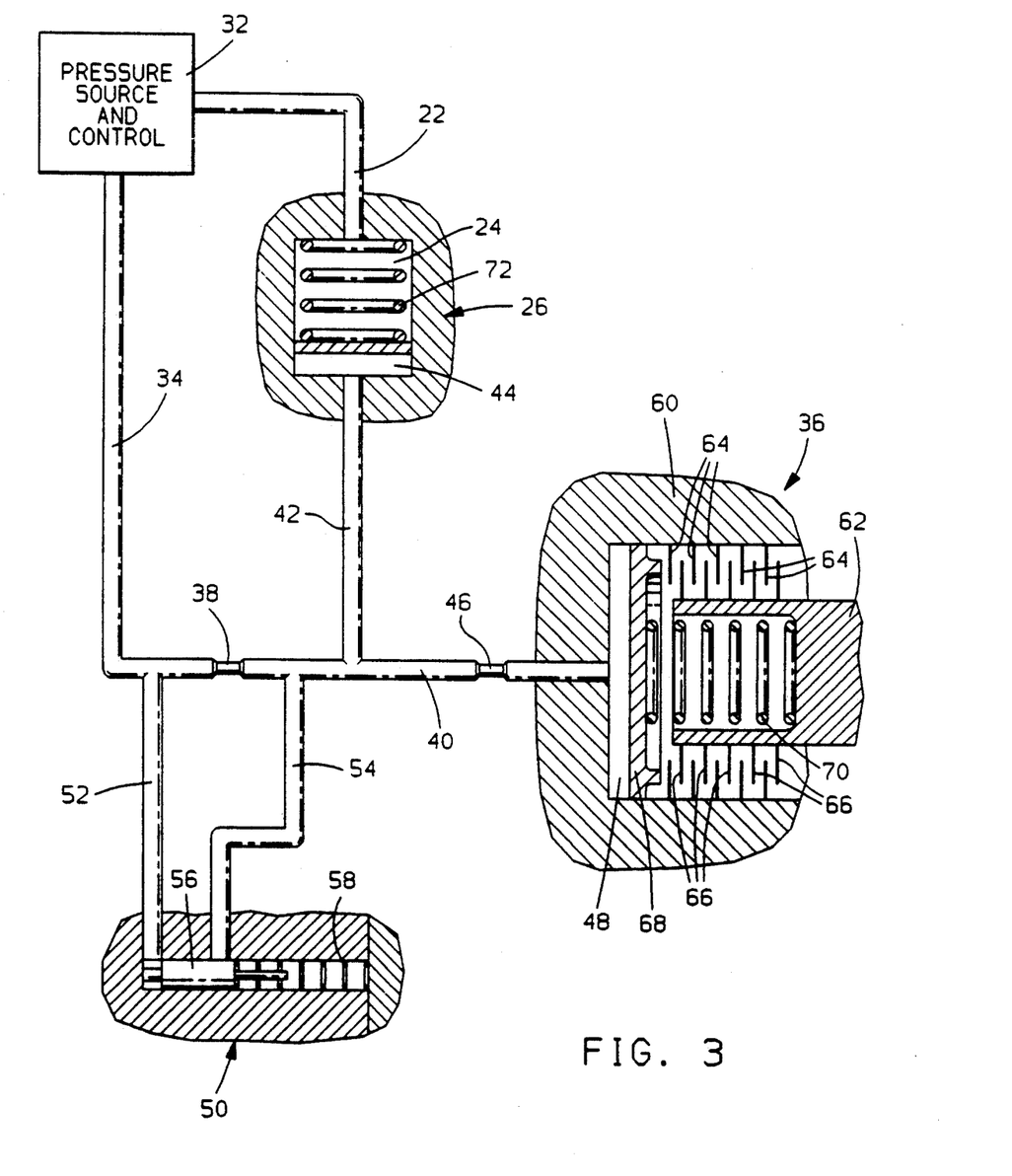
FIG. 3 is a schematic representation of the elements incorporated in the clutch fill circuit.

The accumulator control valve 18 distributes a bias pressure through a passage 22, as seen in both FIGS. 3 and 4, to a bias chamber 24 of a conventional accumulator 26. The pressure regulator valve 20 distributes fluid pressure through a main passage 28 which is connected with a conventional manual selector valve 30 and other conventional transmission control valves, not shown.

The control devices shown in FIG. 4 are represented in the pressure source and control box 32, shown in FIG. 3. The pressure source also includes a pump for delivering fluid to the system. The output pressure from the manual selector valve 30 is directed through a passage 34 to provide engagement fluid for a conventional clutch 36. The passage 34 is connected with a flow restriction or accumulator feed orifice 38, which in turn, is connected to passages 40 and 42 to accumulator chamber 44 formed in the accumulator 26. The passage 40 is also in fluid communication through a clutch fill restriction or orifice 46 to an apply chamber 48 of the clutch 36.

An orifice bypass valve 50 is disposed in a pair of fluid passages 52, in fluid communication with passage 34, and passage 54, in fluid communication with passage 40. The bypass valve 50 includes a plug valve 56 which is urged by a spring 58 to close communication between the passage 52 and 54, such that the fluid flowing to the clutch 36 must pass through the restriction 38. However, it is possible, by presenting sufficient fluid pressure to the orifice bypass valve 50, to cause the plug valve 56 to move rightward against the spring 58, thereby permitting unrestricted fluid flow between the passages 34 and 40 in bypass relation with the restriction 38.

The clutch 36 is a conventional fluid operated friction clutch having an input housing 60 driven by a power shaft, not shown, an output shaft 62 drivingly connected to other power transmitting components of a transmission, not shown, which in turn are connected to a conventional wheel drive mechanism for a vehicle. A plurality of friction discs or plates 64 are drivingly connected to the input housing 60 and are interleaved with a plurality of friction discs or plates 66 which are drivingly connected to the output shaft 62. A piston 68 is slidably disposed in the chamber 48 and is urged leftward by a clutch return spring 70.

When the clutch engagement pressure in chamber 48 acting on the piston 68 is sufficient to overcome the force in the return spring 70, the piston 68 will move rightward to engage one of the friction plates 64. Slightly further movement of the piston 68 will cause axial movement of the friction plates 64 and 66, until they are tightly held in frictional engagement. This type of clutch operation is well known and is mentioned here simply to reinforce the need for a clutch prefill time. During the clutch prefill time, the fluid pressure in chamber 48 will rise to a level sufficient to permit the piston 68 to overcome the force in spring 70. Clutch capacity increase time occurs when the friction discs have been placed in frictional engagement and the pressure increases within the chamber 48 to provide increased torque capacity within the clutch.

In order for the pressure in the chamber 48 to increase sufficiently to complete the engagement of the clutch 36, the pressure in the accumulator chamber 44 must also increase, and in doing so, will increase in volume while compressing a bias spring 72. The rate of pressure rise within the accumulator is determined by the rate of the spring 22 and the flow volume within the passage 42.

The beginning of the accumulator stroke is determined by the installed force of the bias spring 72 plus the pressure in the bias chamber 24. That is, when the operator desires to move from a neutral to a drive condition, which requires the engagement of accumulator 26, fluid pressure is directed via passage 34 and orifice 38 to passages 40 and 42 to begin pressurizing the accumulator 26. Fluid pressure is also directed via passage 40 and restriction 46 to begin filling the chamber 48.

If a high flow high pressure system is utilized, the accumulator will begin stroking significantly before the clutch piston has overcome the return spring 70. This will result in the accumulator filling more rapidly than desired, or in requiring a significantly larger accumulator volume to provide the desired clutch engagement feel. If a lower flow system is utilized, the clutch pressure and accumulator pressure will be more in agreement, however, the clutch fill time will be longer than desired. as a result, the prior art fill circuits generally have a compromise which results in less smoothness than desired.

The present invention incorporates the bypass valve 50 which is opened by a pressure pulse in the passages 34 and 42 to permit a predetermined opening time during which high pressure fluid bypasses the orifice 38. After the predetermined pulse time, the pressure in passage 34, and therefore passage 52, is returned to a more normal clutch feed cycle, such that the bypass valve 50 will close and the orifice 38 and restriction 46 along with accumulator 26 will control the clutch engagement time.

Figures 1A, 1B:
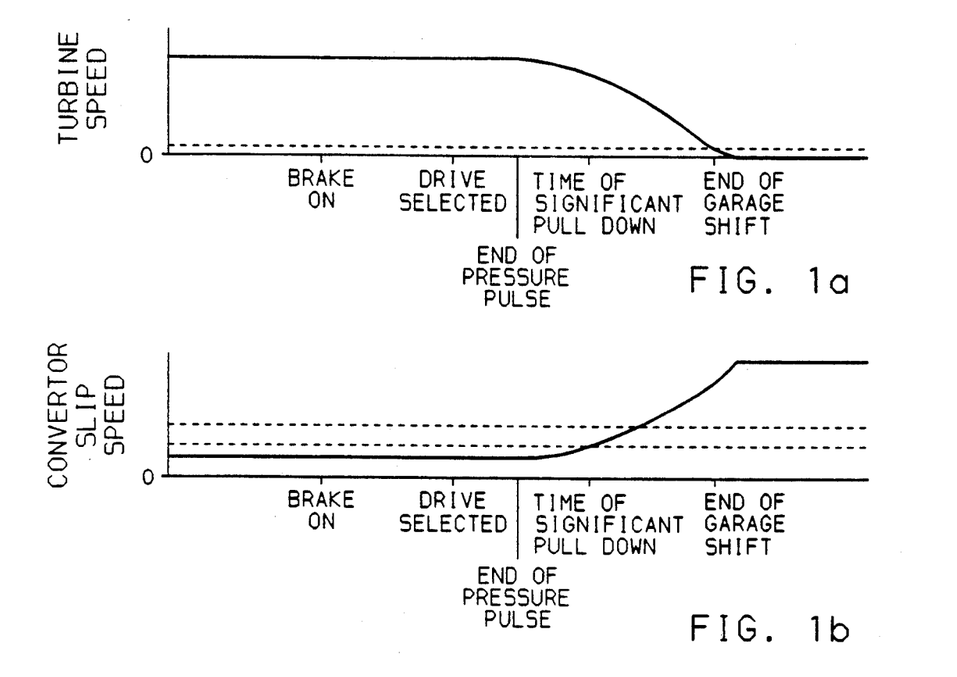
FIGS. 1a through 1g are curves representing various system parameters during the clutch engagement cycle.
Figure 1C:
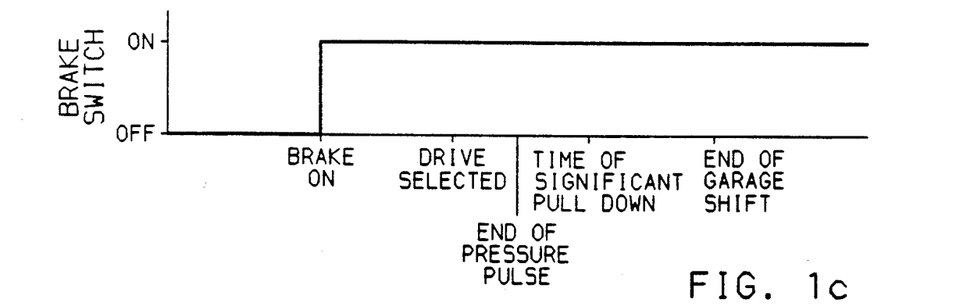
Figure 1D:
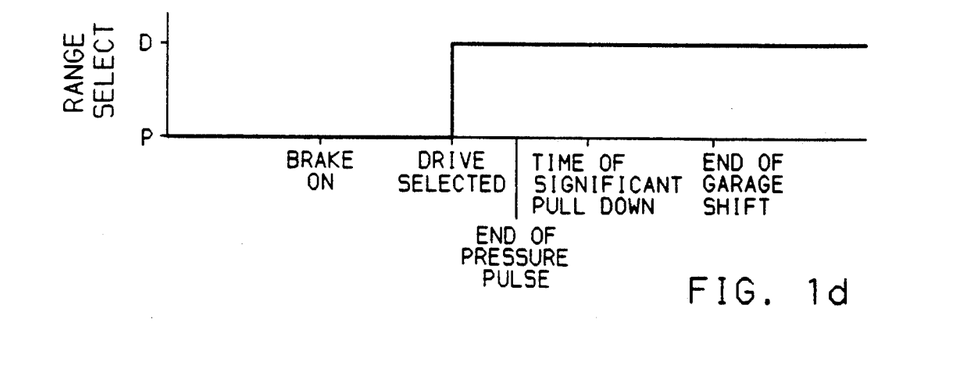
Figure 1E:
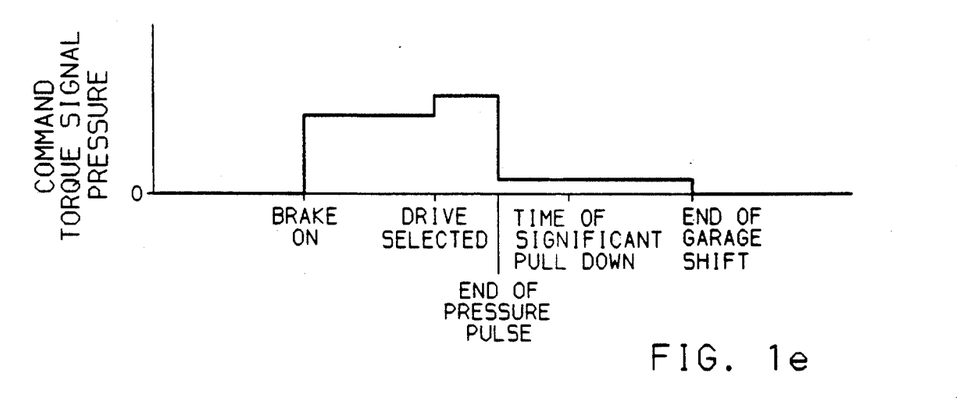
Figure 1F:
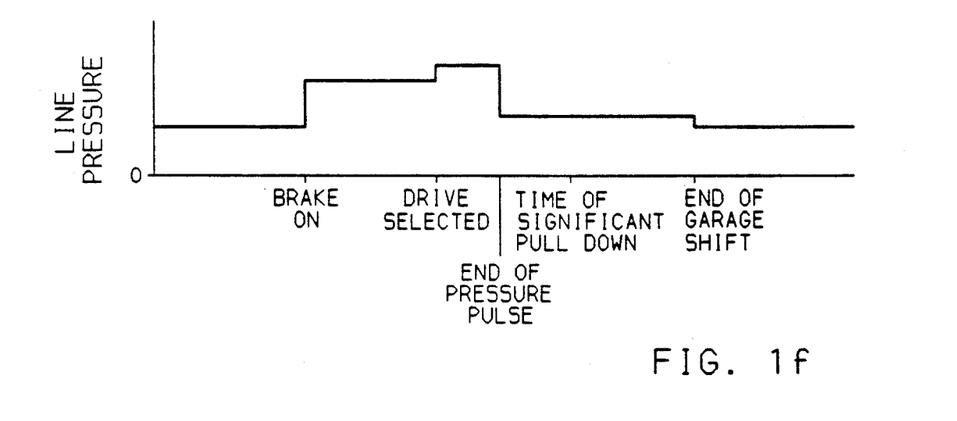

The pressure pulse from the pressure source 32 is controlled by the powertrain control module which incorporates an electronic processor. The processor is controlled during the garage shift routine in accordance with the algorithm described in FIGS. 2a through 2d. The algorithm determines whether the vehicle brake has been applied, and if so, as seen in FIGS. 1c, 1e and 1f, some changes occur within the system. Namely, the variable force solenoid 10 will cause an increase in the torque pressure signal in passage 14 which will result in an increase in the bias pressure in chamber 24 of the accumulator 26.

The torque signal pressure increase in passage 16 will result in an increase in line pressure. At this time, if the operator selects a transition from neutral or park to forward drive or reverse drive, the manual valve 30 will be opened distributing fluid pressure to the passage 34 and simultaneously the torque signal pressure in passage 14 and 16 will be pulsed to an even higher value which will be sufficient to permit the opening of the orifice bypass valve 50. The pressure pulse will continue for a predetermined period of time after which the torque signal pressure and the line pressure will reduce to a value more consistent with a normal clutch engagement. The electronic control unit, however, will continue to receive signals, one of which represents the slip within the torque converter which is an indication of the clutch engagement time.

Figure 1G:
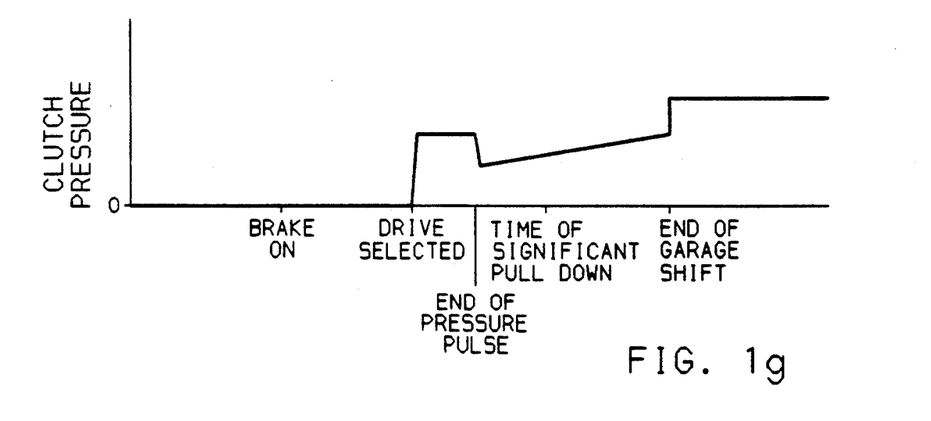
Figure 2A:
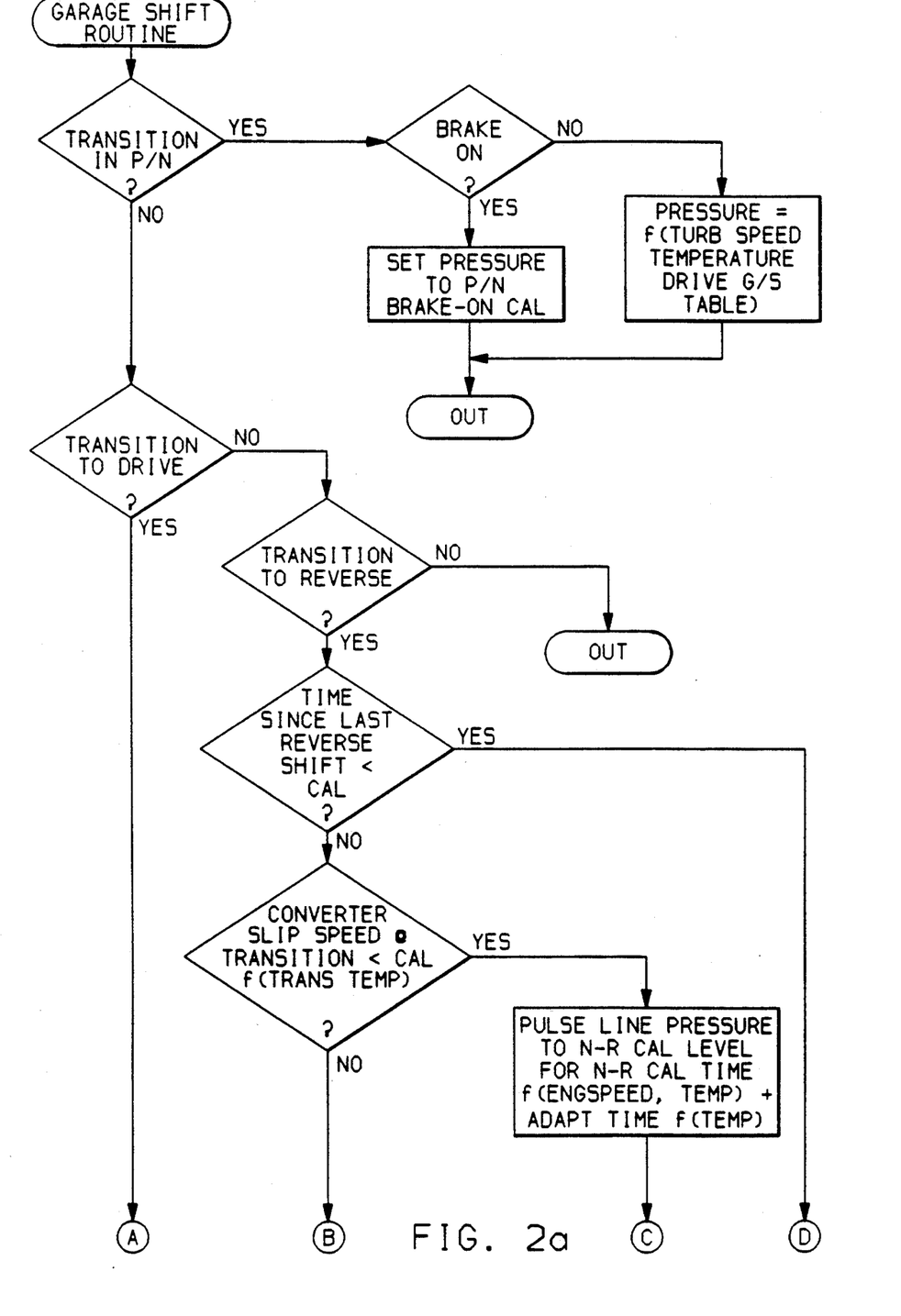
FIGS. 2a through 2d represent an algorithm which is used in conjunction with a transmission control module incorporating an electronic processing unit and a hydraulic pressure control and distribution system.
Figure 2B:
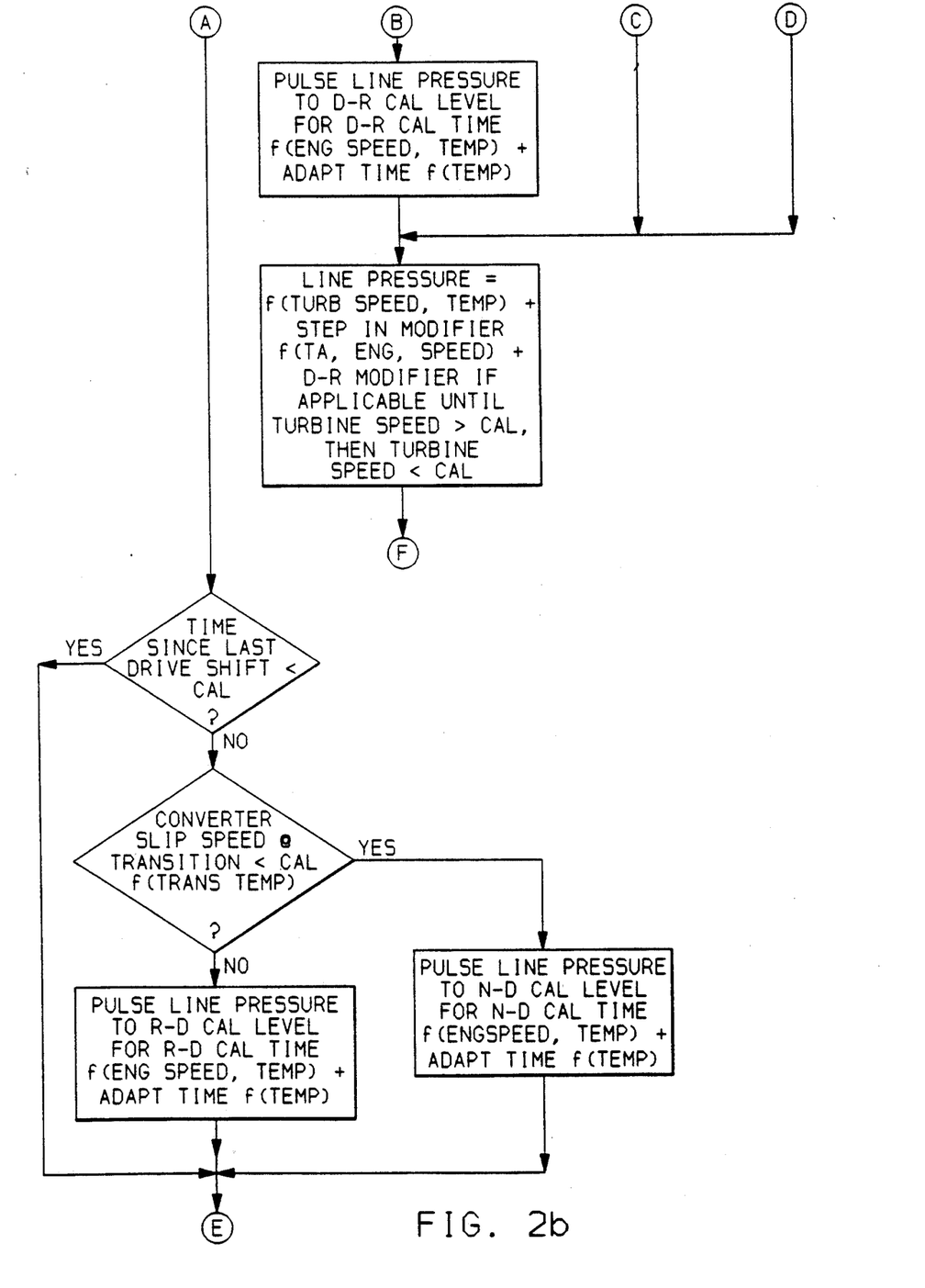
Figure 2C:
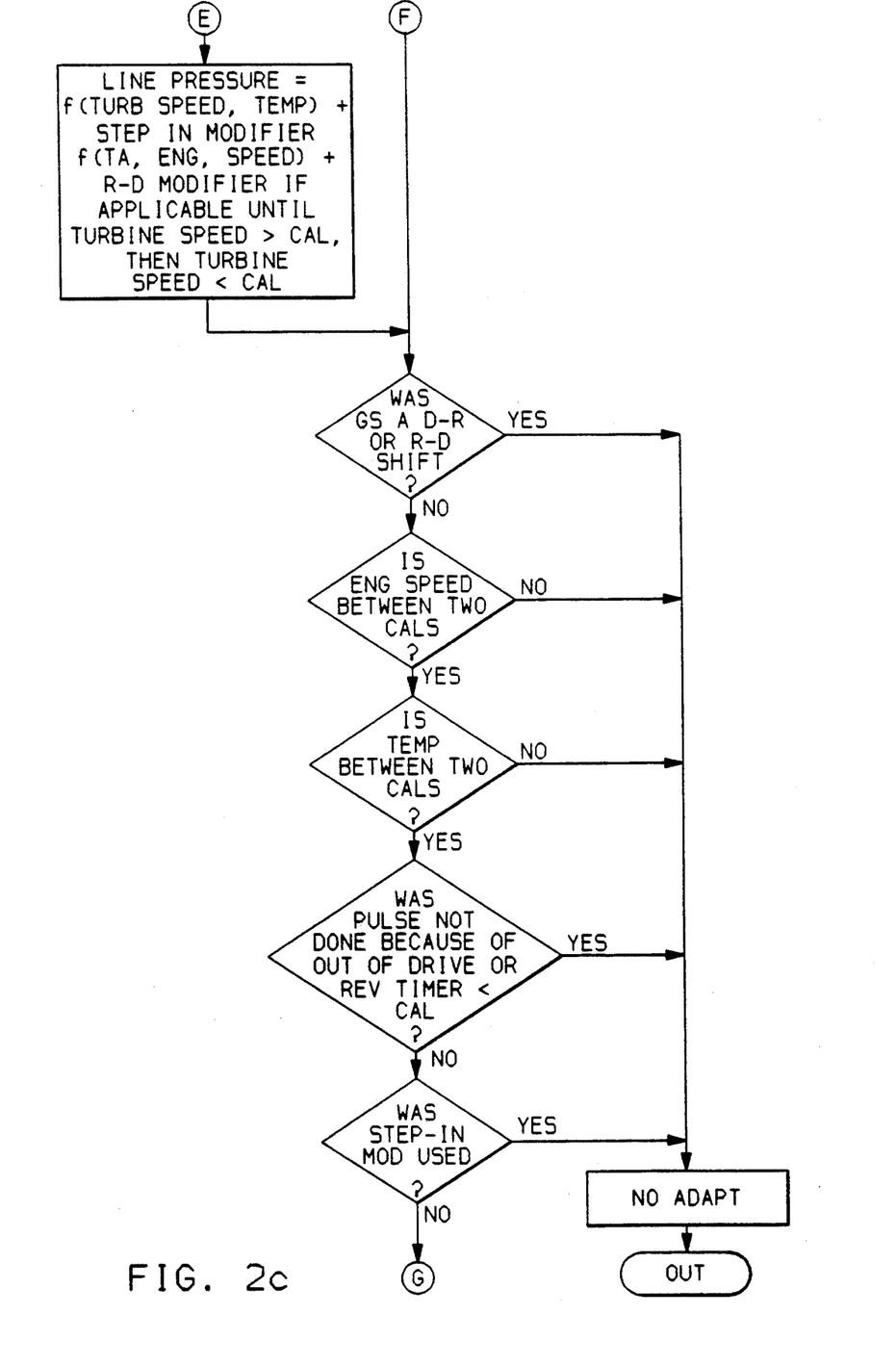
Figure 2D:
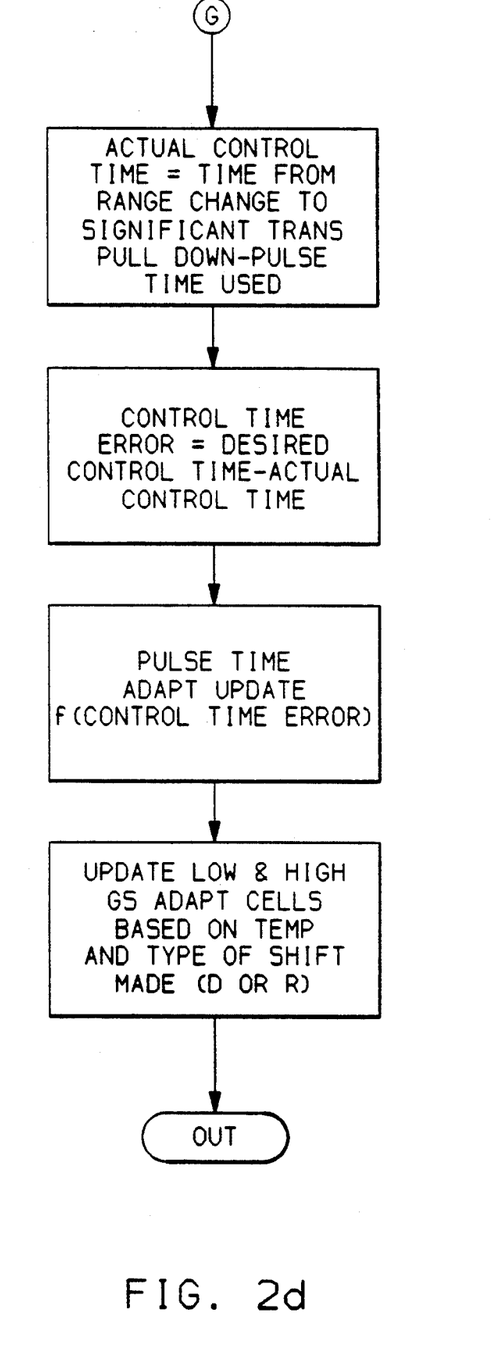

As seen in FIG. 1g, the clutch pressure will be pulsed as the neutral to drive shift is made and at the end of the pulse, the clutch engagement pressure will rise on a slope determined by the accumulator 26. The turbine speed of the torque converter will, of course, begin to reduce or decrease as the clutch is engaged, and it is the turbine speed change which signifies the clutch engagement time. The circuit determines a time of significant pulldown which signifies the clutch engagement time period. If the time between the end of the pressure pulse and the time of significant pulldown is beyond a predetermined range, either greater or lesser, a correction is made to the data stored in the powertrain control module which will cause an increase in pulse time if the garage shift is determined to be too slow, or a reduction in pulse time if the garage shift is determined to be too rapid.

There are many factors other than the time difference between the end of the pressure pulse and the time of significant pulldown which must be considered prior to an adaptive update being made in the data in the powertrain control module. For example, if the brake was not applied during the transition, there will be more no adaptive update made. If the transition is not to either forward or reverse, there will be no adaptive update made. If the time since the previous shift to either forward or reverse is not over a significant value, an adaptive update will not be made.

The operation of the algorithm is self explanatory in viewing FIGS. 2a through 2d. The electronic control module reviews the engine speed condition, the operating temperature, the time between the present garage shift and a previous garage shift, the condition of the throttle or vehicle accelerator in determining whether an adaptation should be made. The powertrain control module also reviews some of these features or parameters in determining what the pressure pulse value and time should be during the shift from neutral to drive.

What should, however, be apparent to those skilled in the art, is that the present invention will permit the clutch circuit to be rapidly filled with fluid pressure to a point where the clutch pressure is sufficient to overcome the clutch return spring, and because of the increase in the trim pressure in chamber 24, the accumulator 26 has not begun to stroke thus preserving the full accumulator volume for utilization during clutch engagement time. These are important factors in controlling the smoothness of a neutral to drive garage shift.

With this system, both the accumulator bias pressure and the line pressure are pulsed to a high value for a short period of time during the prefill cycle and the preengagement movement of the clutch piston. The pressures are then reduced to a low magnitude to allow for a smooth clutch apply. During the high pressure prefill period, the accumulator orifice is bypassed, thus effective increasing the available fluid during the time period. This combination of high pressure feed and large feed orifice results in a significant flow rate to the clutch circuit, while the high accumulator bias prevents accumulator stroking during the prefill and initial piston stroke period.

During the low pressure apply period, the orifice bypass valve is closed such that the accumulator feed orifice is again effective to control fluid flow into the clutch feed circuit, thus resulting in a low flow rate controlled engagement time. Because of the low flow rate, there is no significant difference between the pressures in the accumulator and the clutch apply chamber. This permits the accumulator size to be maintained at a minimum in that the accumulator stroke does not begin until the clutch pressure is substantially equal to the clutch spring force.

The algorithm utilized for this system controls the time length of the pressure pulse during the clutch prefill period. The time length of the pressure pulse is controlled as a function of engine speed, temperature and the type of shift selected by the operator. The control system is a self-learning type system in that the pressure pulse is shorter than the required clutch engagement time, such that the system does not require that the pressure pulse end at the time of significant pulldown. The system does, however, recognize the differences between the end of the pulse and the total clutch engagement time, such that the pressure pulse time can be increased or decreased as required to provide the desired clutch engagement time.

It is important that the high pressure high flow portion of the clutch engagement cycle be finished before the clutch piston has sufficient force thereon to begin compressing the friction plates, otherwise the fluid inertia will result in rapid engagement of the clutch which is not desired. The fact that the pulse time is adaptive, permits the control to establish the proper garage shift time in transmission where the clutch feed restriction will vary because of differences in the fluid path which might occur as a result of casting processes. This control also can be used in a transmission family wherein the fluid paths vary from one family member to another, thus resulting in a variance in the flow restrictions.

Obviously, many modifications and variations of the present invention are possible in light of the above teaching. It is therefore to be understood, that within the scope of the appended claims, the invention may be practiced otherwise than as specifically described.

We claim:

1. A flow control in a hydraulic control system having an accumulator including a bias pressure chamber, a fluid operated piston, a source of fluid pressure having a range of values including a high value, said flow control comprising a first passage means in communication with said source, said accumulator downstream of said source and said piston downstream of said accumulator; a first flow restriction disposed in said first passage means intermediate said source and said accumulator; a second flow restriction means disposed in said first passage means intermediate said accumulator and said fluid operated piston; a second passage means connected with said first passage means at a first location upstream of said first flow restriction means and at a second location intermediate said first restriction and said second restriction; valve means operatively connected in said second passage for selectively preventing fluid flow in bypassing relation with said first flow restriction means when said sources of fluid pressure is at or below said high value and permitting fluid flow therethrough when the source of fluid pressure is above said high value; a vehicle brake signal; and means for supplying a torque signal pressure to said bias pressure chamber and for increasing the torque signal pressure in the bias pressure chamber in response to the vehicle brake signal.

2. A flow control in a hydraulic control system having an accumulator, a fluid operated piston, a source of fluid pressure having a range of values including a high value, said flow control comprising a first passage means in communication with said source, said accumulator downstream of said source and said piston downstream of said accumulator; a first flow restriction disposed in said first passage means intermediate said source and said accumulator; a second flow restriction means disposed in said first passage means intermediate said accumulator and said fluid operated piston; a second passage means connected with said first passage means at a first location upstream of said first flow restriction means and at a second location intermediate said first restriction and said second restriction; and valve means operatively connected in said second passage for selectively preventing fluid flow in bypassing relation with said first flow restriction means when said sources of fluid pressure is at or below said high value and permitting fluid flow therethrough when the source of fluid pressure is above said high value; and means for pulsing fluid pressure from said source to a value above said high value for a predetermined time.

3. The flow control defined in claim 2 and said fluid operated piston being operable to engage a clutch means; and means for determining the engagement time of said clutch means and for determining an adjustment of the pulsing time of fluid pressure when the engagement time is outside of a predetermined range.

* * * * *